United States Patent
Porter et al.

(10) Patent No.: US 6,174,255 B1
(45) Date of Patent: Jan. 16, 2001

(54) DIFFERENTIAL LOCK CONTROL SYSTEM FOR ARTICULATED WORK VEHICLE

(75) Inventors: Thomas Alan Porter, Zwingle; Gregory Keith Werner, Durango, both of IA (US)

(73) Assignee: Deere & Company, Moline, IL (US)

( * ) Notice: Under 35 U.S.C. 154(b), the term of this patent shall be extended for 0 days.

(21) Appl. No.: 09/412,912

(22) Filed: Oct. 5, 1999

(51) Int. Cl.[7] ................................................. F16H 48/20
(52) U.S. Cl. .............................................. 475/84; 180/235
(58) Field of Search ................................ 475/84, 86, 231; 477/35; 180/235, 197; 701/69, 88

(56) References Cited

U.S. PATENT DOCUMENTS

| | | | |
|---|---|---|---|
| 4,062,420 | * 12/1977 | Stedman | 180/89.1 |
| 4,070,924 | * 1/1978 | Moreno et al. | 475/86 |
| 4,113,044 | * 9/1978 | Williams et al. | 180/235 |
| 4,320,813 | * 3/1982 | Manna | 180/249 |
| 4,523,494 | 6/1985 | Sparks et al. | 475/86 |
| 4,549,448 | 10/1985 | Kittle | 475/86 X |
| 4,559,847 | 12/1985 | Newendorp et al. | 475/86 |
| 4,570,509 | 2/1986 | Nighswonger | 475/86 |
| 4,895,217 | * 1/1990 | Hueckler et al. | 180/233 |
| 5,505,267 | * 4/1996 | Orbach et al. | 180/197 X |
| 5,535,124 | * 7/1996 | Hosseini et al. | 180/235 X |
| 5,927,422 | * 7/1999 | Schakel | 701/88 X |
| 6,009,969 | * 1/2000 | Salcher et al. | 701/88 X |

OTHER PUBLICATIONS

John Deere brochure entitled "Loaders 544G 624G 644G", pp. 1–22, printed in the U.S., 1996.
John Deere brochure entitled "Loaders 444H 544H", pp. 1–20, printed in the U.S, 1999.

\* cited by examiner

*Primary Examiner*—Charles A. Marmor
*Assistant Examiner*—Ankur Parekh

(57) ABSTRACT

An articulated four wheel drive work vehicle is provided with a front axle having a front differential and a rear axle having a rear differential. Both differentials are provided with hydraulically operated differential locks that are coupled to respective solenoid control valves. The solenoid control valves are coupled to a microprocessor. The microprocessor has a manual mode in which the differential locks are controlled by a foot pedal in the operators cab and an automatic mode in which the microprocessor controls the differential locks in response to speed signals from the axles and the transmission. The microprocessor calculates a predicted axle speed based on the transmission output speed signal received by a transmission speed sensor. The microprocessor then compares this signal to the actual axle speed signals received from axle speed sensors and triggers the respective solenoid valve if the difference is greater than a programmed amount. An articulation angle sensor sends an articulation angle signal to the microprocessor. If the articulation is greater than a programmed amount the solenoid locks are released.

8 Claims, 1 Drawing Sheet

DIFFERENTIAL LOCK CONTROL SYSTEM FOR ARTICULATED WORK VEHICLE

BACKGROUND OF THE INVENTION

1. Field of the Invention

The invention is directed to an automatic differential lock which is actuated when the wheels on one side of the differential slip in relation to wheels on the other side of the differential more than a programmed amount.

2. Description of the Prior Art

Off road vehicles may be provided with differentials that can be selectively locked and unlocked. Typically the differential lock is controlled by a solenoid operated differential lock control valve that is controlled by a single manually operated foot pedal. To actuate the differential lock the operator must continually depress the foot pedal. Because the differential lock may interfere with steering the differential lock may be disengaged when the vehicle is steered either by application of left or right brakes, or the steering system itself. See U.S. Pat. Nos. 4,523,494 and 4,570,509.

In another differential lock control system, the left and right brakes and the speed of the vehicle can disengage an applied differential lock. The differential lock can be reengaged in response to signals from a steering sensor, a wheel slippage sensor and a draft load sensor. See U.S. Pat. No. 4,549,448.

SUMMARY OF THE INVENTION

An articulated four wheel drive work vehicle is provided with a front assembly having a front axle and left and right front wheels, and a rear assembly having a rear axle and left and right rear wheels. The front assembly and the rear assembly are pivotally coupled to one another by an vertical articulation joint. The front axle is provided with a front differential having a hydraulically actuated front differential lock. The rear axle is provided with a rear differential having a hydraulically actuated rear differential lock. The axles are driven by a transmission having a front mechanical output and a rear mechanical output that are operatively coupled to receiving mechanical inputs on the front and rear differentials.

The front and rear differential locks are coupled to a differential control valve having a front solenoid control valve for directing pressurized hydraulic fluid to the front differential lock and a rear solenoid control valve for directing pressurized hydraulic fluid to the rear differential lock. The solenoid control valves are electrically coupled to a microprocessor which can independently activate the front and rear solenoid control valves. The microprocessor is electrically coupled to a transmission speed sensor located on the transmission, a front axle speed sensor located on the front axle, and a rear axle speed sensor located on the rear axle. The transmission speed sensor senses the output speed of the transmission. The front and rear axle sensors measure the speed of either the left or right axles on either side of the respective differential. The microprocessor is programmed to calculate a predicted axle speed based on the transmission output speed signal from the transmission speed sensor. The microprocessor then compares the predicted output speed to the actual front axle speed signal from the front axle speed sensor. If the actual front axle speed signal differs from the predicted speed more than a programmed amount the microprocessor applies the front differential lock. The same is true for the rear differential lock. The microprocessor compares the predicted output speed to the actual rear axle speed signal from rear axle speed sensor. If the actual rear axle speed signal differs from the predicted speed more than a programmed amount the microprocessor applies the rear differential lock.

An articulation angle sensor senses how much the front assembly and the rear assembly are articulated relative to one another. This sensor sends an articulation angle signal to the microprocessor. If the articulation is greater than a programmed amount the solenoid locks are released.

A two position MAN/AUTO switch is also coupled to the microprocessor and directs the microprocessor to either work in the manual mode or the automatic mode. If the switch is in the manual position both differential locks are manually applied by the operator depressing a foot pedal switch in the cab of the vehicle.

DETAILED DESCRIPTION

Figure 1:
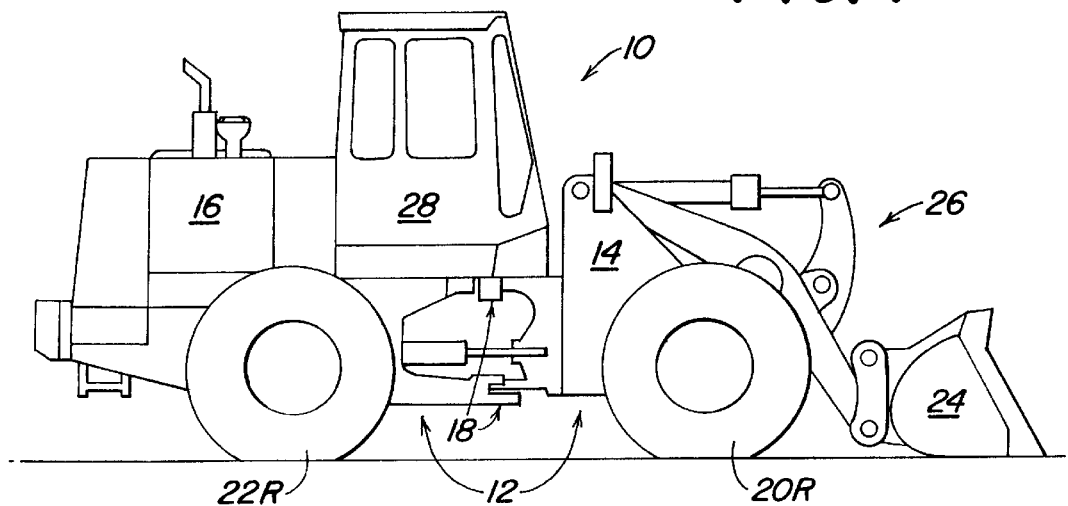
FIG. 1 is a side view of a off road work vehicle.
Figure 2:
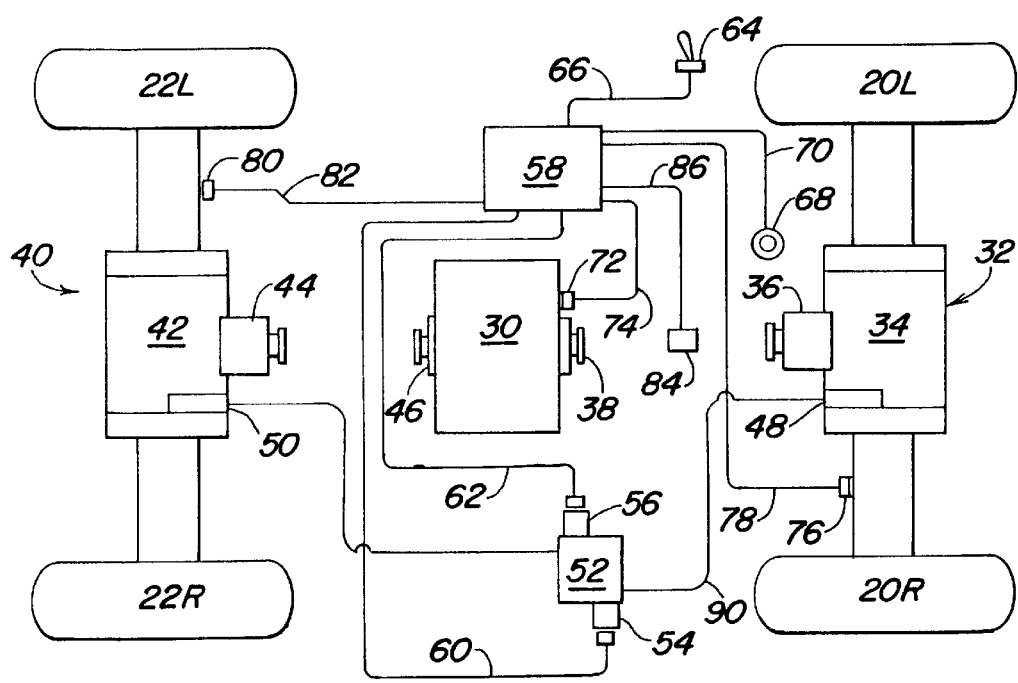
FIG. 2 is a schematic of the automatic differential lock.

FIG. 1 discloses an off road work vehicle in the form of a four wheel drive loader 10. This vehicle is provided with a frame 12 having a front assembly 14 and a rear assembly 16 that are pivotally joined together at articulation 18. The front assembly 14 is supported on front drive wheels 20R and 20L (the suffix R designating the right drive wheel and L the left drive wheel). The rear assembly 16 is supported on rear drive wheels 22R and 22L. The front assembly 14 is also provided with a work implement in the form of a loader bucket 24 that is controllably coupled to the front assembly by bucket linkage 26. The rear assembly 16 is provided with an operators cab 28 in which the operator controls the loader. The loader is powered by an internal combustion engine, not shown, mounted to the rear assembly 16. The internal combustion engine powers a transmission 30 for propelling the vehicle and hydraulic pumps for manipulating hydraulic cylinders to steer the vehicle and to operate the loader bucket 24.

The front wheels 20R and 20L are mounted to front axle 32 which is provided with a differential 34 having a mechanical input 36. A forwardly extending drive shaft, not shown, extends between the front mechanical output 38 of the transmission 30 and the front mechanical input 36 of the front axle 32. The front differential 34 divides the driving force equally between the wheels 20R and 20L and allows one wheel to rotate faster than the other wheel. Similarly the rear wheels 22R and 22L are mounted to rear axle 40 having a differential 42 with mechanical input 44. A rearwardly extending drive shaft, not shown, extends between the rear mechanical output 46 of the transmission 30 and the rear mechanical input 44 of the rear axle 40. Again the rear differential 42 divides the power evenly between the rear wheels 22R and 22L and allows one wheel to rotate faster than the other. The above described arrangement is relatively conventional. In the preferred embodiment both axles are identical except they have been reversed so that the mechanical inputs 36 and 44 face the mechanical outputs 38 and 46 of the transmission 30.

Both differentials 34 and 42 are provided with differential locks 48 and 50 respectively. The differential locks lock the two drive axles extending transversely from the differential together so that they rotate together at the same speed and the wheels are driven at the same speed. These differential locks 48 and 50 are conventional and are actuated by pressurized hydraulic fluid supplied from a differential control valve 52 having a front differential solenoid control valve 54 and a rear differential solenoid control valve 56.

The front and rear solenoid control valves 54 and 56 are electrically coupled to microprocessor 58 by electric output lines 60 and 62, respectively. The microprocessor 58 is provided with a two-position MAN/AUTO switch 64 which is electrically coupled to the microprocessor by electric input line 66. The AUTO position triggers the automatic operation of the differential locks 48 and 50 by the microprocessor and the MAN position triggers the manual operation of the differential locks by the foot pedal switch 68 that is electrically coupled to the microprocessor by electric input line 70. The foot pedal switch 68 is normally open and is closed by the operator stepping down on the pedal activating the differential lock. Therefor, in the manual mode, the operator must continually depress the foot pedal switch to lock both differentials and release of the foot pedal switch to unlock both differentials. It should be noted that the foot pedal switch 68 can be arranged electrically parallel to the microprocessor 58 if it is desired to manually trigger the differential locks in addition to the automatic operation of the differential locks by the microprocessor 58.

The microprocessor 58 is provided with four sensor inputs. The first sensor input is a transmission speed sensor 72 that is mounted to the transmission 30 and is electrically coupled to the microprocessor 58 by electric input line 74. Transmission speed sensor 72 signals the microprocessor as to the output speed of the transmission 30. The second sensor input is a right front axle speed sensor 76 that is mounted to the right side of front axle 32 and which is electrically coupled to the microprocessor by electric input line 78. The right front axle speed sensor 76 signals the microprocessor 58 as to the speed of the right front axle that is coupled to right front drive wheel 20R. The third sensor input is a mirror image of the second sensor input in that a left rear axle speed sensor 80 is mounted to the left side of the rear axle 40 and is electrically coupled to the microprocessor 58 by electric input line 82. The left rear axle speed sensor 80 signals the microprocessor 58 as to the speed of the left rear axle that is coupled to left rear drive wheel 22L. The fourth and last sensor input is an articulation angle sensor 84 that is coupled to the articulation 18 and is electrically coupled to the microprocessor 58 by electric input line 86.

In operation the microprocessor 58 first determines if it is operating in the manual mode or the automatic mode as dictated by switch 64. If it is operating in the manual mode the signal from foot pedal switch 68 is passed directly to the solenoid control valves 54 and 56 of the differential control valve 52 locking the differential of both the front and rear differentials 34 and 42. If it is operating in the automatic mode the microprocessor next checks the articulation angle of the vehicle as signaled by sensor 84. If the articulation angle is less than 10 degrees the microprocessor moves onto the next step. If the articulation angle is greater than or equal to 10 degrees the microprocessor returns to the beginning. Various articulation limits may be programmed into the microprocessor, 10 degrees was chosen as an example. In the next step the microprocessor calculates the predicted axle speed of the front axle and the rear axle assuming that both the left and right transverse live axles are running at the same speed. The predicted speed is calculated from the transmission output speed signal received from transmission speed sensor 72. The microprocessor stores this predicted speed and moves onto the next step.

In the next step the microprocessor compares the actual right front axle speed signal of sensor 76 to the predicted speed previously calculated. If the actual front axle speed is more than 5% different from the predicted speed the differential lock 48 is activated. This comparison can be done by dividing the actual speed by the predicted speed. If the quotient of this calculation is greater than 1.05 or less than 0.95 the front differential lock is triggered by the microprocessor 58 by energizing front solenoid valve 54 through electric output line 60. The solenoid valve 54 in turn directs hydraulic fluid through supply/return line 90 to front differential lock 48.

The microprocessor next moves onto comparing the predicted speed with the rear axle speed signal from sensor 80. The comparisons are substantially identical except that if the actual is different by more than 5% the rear differential lock 50 is actuated by solenoid valve 56 in response to a command signal from microprocessor 58. The 5% trigger was chosen as an example and other limits can be programmed into the microprocessor.

In operation the operator would select what mode he wants the machine operated, if it is in the automatic mode the operator adjusts switch 64 to AUTO. As the vehicle is operated, the left front wheel 20L may encounter reduced traction conditions when compared to the right front wheel 20R. In this situation the front differential 34 would allow the left front wheel 20L to speed up and correspondingly reduce the speed of the right front wheel 20R. The microprocessor 58 would sense the reduced speed of the right front wheel 20R through sensor 76. If this speed reduction is more than 5% of the predicted speed as calculated by the microprocessor 58 based on the output speed of the transmission 30 as signaled by sensor 72, the front solenoid valve 54 is energized sending pressurized hydraulic fluid through line 90 to the front differential lock 48. The locked front differential 34 would keep both front wheels 20R and 20L rotating at the same speed slowing down the left front wheel 20L and speeding up the right front wheel 20R. The rear differential lock 50 would be operated in the same manner as the front differential lock 48 described above.

In the automatic mode of operation, the differential locks are actuated separately and the determination to operate the front or back is made independently. Therefore only the front differential lock may be triggered, only the back differential lock may be triggered or both differential locks may be triggered.

The invention should not be limited by the above described embodiment, but should be limited solely by the claims that follow.

What is claimed is:

1. A work vehicle for performing a work operation, the work vehicle comprising:

a front assembly having a front axle that is provided with a front differential having a front differential lock, the front axle has a left front axle for driving a left front wheel and a right front axle for driving a right front wheel, the front differential is provided with a front mechanical input;

a rear assembly having a rear axle that is provided with a rear differential having a rear differential lock, the rear axle has a right rear axle for driving a right rear wheel and a left rear axle for driving a left rear wheel, the rear differential is provided with a rear mechanical input;

an articulation joint joining the front assembly to the rear assembly so that the front and rear assemblies can pivot about a vertical pivot axis relative to one another;

a transmission having a mechanical front output for driving the front mechanical input and a rear mechanical output for driving the rear mechanical input, the front mechanical output and the rear mechanical output are driven at an output speed;

a microprocessor is operatively coupled to the front and rear differential locks for selectively locking the front and rear differentials;

a transmission speed sensor for sensing the output speed of the transmission and sending a transmission output speed signal to the microprocessor;

a front axle speed sensor located on the front axle, the front axle speed sensor sensing how fast one of the right front axle and left front axle is rotating and sending an actual front axle speed signal to the microprocessor;

a rear axle speed sensor located on the rear axle, the rear axle speed sensor sensing how fast one of the right rear axle and left rear axle is rotating and sending an actual rear axle speed signal to the microprocessor;

an articulation angle sensor measures how much the front assembly and the rear assembly are articulated to one another sending an articulation angle signal to the microprocessor;

wherein the microprocessor calculates a predicted axle speed based on the transmission output speed signal, the microprocessor compares the predicted axle speed to the actual front axle speed signal, if the actual front axle speed signal differs from the predicted speed more than a programmed amount the microprocessor applies the front differential lock, the microprocessor also compares the predicted axle speed to the actual rear axle speed signal, if the actual rear axle speed signal differs from the predicted speed more than a programmed amount the microprocessor applies the rear differential lock.

2. A work vehicle as defined by claim 1 wherein the microprocessor releases the front and rear differential locks, if applied, when the articulation angle signal is greater than a programmed amount.

3. A work vehicle as defined by claim 2 wherein the microprocessor is electrically coupled to a differential lock control valve, the differential lock control valve is provided with a front solenoid valve that is hydraulically coupled to the front differential lock when the front differential lock is applied by the microprocessor, the microprocessor sends a signal to the front solenoid valve, the differential lock control valve is provided with a rear solenoid valve that is hydraulically coupled to the rear differential lock when the rear differential lock is applied by the microprocessor, the microprocessor sends a signal to the rear solenoid valve.

4. A work vehicle as defined by claim 3 wherein the microprocessor is electrically coupled to a MAN/AUTO switch having a manual position and an automatic position, in the manual position an operator directly controls the front and rear differential locks and in the automatic position the microprocessor controls the front and rear differential locks.

5. A work vehicle as defined by claim 4 wherein the vehicle is provided with a foot pedal switch for manually controlling the front and rear differential locks when the MAN/AUTO switch is in the manual position.

6. A work vehicle as defined by claim 2 wherein the front and rear differential locks are independently applied by the microprocessor.

7. A work vehicle for performing a work operation, the work vehicle comprising:

a front assembly having a front axle that is provided with a front differential having a front differential lock, the front axle has a left front axle for driving a left front wheel and a right front axle for driving a right front wheel, the front differential is provided with a front mechanical input;

a rear assembly having a rear axle that is provided with a rear differential having a rear differential lock, the rear axle has a right rear axle for driving a right rear wheel and a left rear axle for driving a left rear wheel, the rear differential is provided with a rear mechanical input;

an articulation joint joining the front assembly to the rear assembly so that the front and rear assemblies can pivot about a vertical pivot axis relative to one another;

a transmission having a mechanical front output for driving the front mechanical input and a rear mechanical output for driving the rear mechanical input, the front mechanical output and the rear mechanical output are driven at an output speed;

a microprocessor is operatively coupled to the front and rear differential locks for selectively locking the front and rear differentials;

a transmission speed sensor for sensing the output speed of the transmission and sending a transmission output speed signal to the microprocessor;

a front axle speed sensor located on the front axle, the front axle speed sensor sensing how fast one of the right front axle and left front axle is rotating and sending an actual front axle speed signal to the microprocessor;

a rear axle speed sensor located on the rear axle, the rear axle speed sensor sensing how fast one of the right rear axle and left rear axle is rotating and sending an actual rear axle speed signal to the microprocessor;

an articulation angle sensor measures how much the front assembly and the rear assembly are articulated to one another sending an articulation angle signal to the microprocessor;

wherein the microprocessor independently applies the front and rear differential locks in response to a comparison of the transmission output speed signal with the actual front axle speed signal and with the actual rear axle speed signal, respectively.

8. A work vehicle as defined by claim 7 wherein the microprocessor releases the front and rear differential locks, if applied, when the articulation angle signal is greater than a programmed amount.

* * * * *